Patented Mar. 11, 1941

2,234,383

UNITED STATES PATENT OFFICE 2,234,383

DENTAL IMPRESSION COMPOSITION

Bennett Preble, Berkeley, Calif., assignor to Surgident, Ltd., Los Angeles, Calif., a corporation of California No Drawing. Application October 28, 1939, Serial No. 301,836

9 Claims. (Cl. 18—47)

This invention relates to reversible dental impression materials and pertains more particularly to dental impression compositions of the hydrocolloid type. This application is a continuation-in-part of my allowed application Serial No. 207,311, filed May 11, 1938, allowed August 24, 1939, for "Dental impression composition."

The principal object of the present invention is to provide a hydrocolloid dental impression composition of high breaking strength and resistance to plastic deformation, and of advantageous characteristics with respect to the setting of gypsum plaster brought in contact therewith in the reproduction of models.

The hydrocolloid dental impression compositions, of which the compositions of the present invention are types, are characterized by being resilient solid gels at temperatures below normal human body temperature, and capable of conversion to a sol condition at temperatures adjacent the boiling point of water. The material is reversible in nature, and will gel when cooled to just below normal human body temperature and may be reconverted into a fluid sol and back again into the gel condition by repeated heating and cooling. The principal constituent employed in such impression compositions is a reversible gel-forming hydrocolloid, such as agar-agar, Irish moss, or Iceland moss, which, when made up in water, will furnish a gel which may be used to faithfully reproduce objects in dimension, but with plain or simple gels have little strength and will fracture under the deformation customarily encountered in dental practice. For this reason it is necessary to add some filler material to the agar-agar gel such as waxes or the like as are disclosed in U. S. Patent to Poller No. 1,672,776, or a reversible thermoplastic material such as is disclosed in U. S. patent to Harrison No. 2,021,059.

The principal effect of these filler materials is that of improving or modifying the solidifying characteristics (development of "body" or consistency) of the material as it is cooled to the solidifying temperature of the hydrocolloid base material, as more particularly described in the above-mentioned Harrison patent. In general, the strength increase directly due to the addition of such fillers is rather small, wherefore while the so-modified composition is preferable to a plain agar composition, the strength of such compositions is not materially increased over the strength of simple agar-agar gels.

In view of the above, one of the important objects of the present invention is to provide a dental impression composition of the hydrocolloid gel type, comprising a base consisting principally of a reversible hydrocolloid gel which has a materially greater strength than simple agar-agar gels or agar-agar gels modified with filler materials as above described. A further object of the invention is to provide a modified hydrocolloid gel in which the desired strength and toughness may be produced without the aid of filler materials, and which is further characterized by an improved development of "body" as the gel passes through the solidification range and enters the gel phase.

A further object of the invention is to provide a dental impression material of the character set forth, having improved characteristics with respect to the setting of gypsum plaster in contact with the impression surfaces wherefore improved plaster casts may be obtained, having a smooth, hard surface which is advantageous in the reproduction of the detail and dimensions of the subject.

There is a group of materials which are known to greatly increase the strength and toughness of hydrocolloid gels formed with vegetable mucilages, which mucilages usually have polymers of derivatives of the hexose sugars as their main constituents, such as agar-agar, Irish moss, or Iceland moss gels. Certain alkaline silicates have been found to toughen these gels, as have hydroxides of the alkali metals, but these particular agents are disadvantageous in a dental impression composition inasmuch as the resulting material is in general too strongly alkaline to be used in a patient's mouth without discomfort or burning if sufficient of the agent is added to obtain a significant toughening effect. Borax (sodium tetraborate decahydrate) has been found effective in securing this desired increase in strength and toughness of such hydrocolloid gels, but the presence of borax heretofore has been found to prevent the proper setting of gypsum plasters, and at the same time a borax-modified gel is caused to have a lesser resistance to plastic deformation whereby the impressions produced with such compositions undergo distortion and permanent deformation when the solidified or gelled impression is pulled from the subject (for example, the teeth), wherefore the accuracy of reproduction is substantially lost.

According to the present invention I incorporate in such a hydrocolloid gel a borate-containing compound, either ordinary borax or any other borate-containing compound, preferably together with a plaster-hardening agent, whereby both the desired strength characteristics and behavior towards dental plaster are obtained. Alkali-metal sulphates, such as potassium sulphate have heretofore been employed in conventional hydrocolloids for the purpose of improving the behavior of such gels with respect to dental plaster, as exemplified by U. S. Patent No. 2,089,552, issued to Laurence E. Harrison, but I have found that when the pH of the borate-containing hydrocolloid material is established within certain broad limits the presence of a plaster-hardening agent, particularly an alkali-metal sulphate, is found not only to cause the gel to have a satisfactory behavior with respect to plaster-setting, but to cause the gel to have high strength characteristics, both as to ultimate rupture and as to plastic deformation.

The effect of the alkali-metal sulphate is believed to be partly physical and partly chemical. It is known that high pH is detrimental to the proper setting of gypsum plaster, and when an alkali-metal sulphate is incorporated in the borate-containing gels a noticeable decrease in pH is secured, which is of direct benefit as regards behavior of the gel composition towards plaster. Many plaster-set accelerators or "hardeners" are known however, and substantially all inorganic salts which increase the solubility of gypsum in water will contribute to the improved behavior towards gypsum plaster of the borate-containing gels of this invention. Such accelerating or hardening agents as also serve to decrease the pH of the gel composition (such as the alkali-metal sulphates, and potassium sulphate in particular) are of particular benefit. Satisfactory behavior towards plaster is conventionally defined in the dental trade as one which will cause or permit a standard (dental grade) gypsum plaster to set hard against the mold within about one-half hour, and produce a casting substantially free of a powdery surface.

The broad pH range of the gel containing both a plaster-set accelerator and a borate compound has been found to be in the neighborhood of pH 6.8 to pH 8.5, although acceptable plaster behavior may be obtained with borate-containing gels in a restricted pH range of from pH 7.9 to pH 8.2 in the absence of such plaster-set accelerator.

The pH of the borate-containing dental hydrocolloid may be established within the desired range by adding to the gel composition a borate compound which will of itself impart the desired pH, or by adding both a borate compound and a buffering agent which will establish the pH value of the gel material within such broad limits. I have found that when the pH value of the gel is controlled, in the presence of a borate radical, the desired toughening, strengthening, and proper behavior toward gypsum plaster is found within the limits of pH 6.8 to pH 8.6 when from 1 to 4% (for example) of an alkali-metal sulphate is also incorporated in the gel, such alkali-metal sulphate being added to the composition as such, or formed therein as a reaction product, dependent upon the procedure followed in compounding the composition. The effective upper limit of the quantity of alkali-metal sulphate which may be added is apparently limited mainly by the unpleasant taste imparted to the composition by excessive quantities, while from the standpoint of operativeness of the material the upper limit is that of complete saturation of the gel at ordinary temperatures. An alkali-metal sulphate concentration in the neighborhood of about 2% to 4% is in general quite satisfactory, although when other conventional plaster accelerators or hardeners such as common salt, alum, or the like, are employed, greater quantities are required for equivalent performance. The effective upper limit of the concentration of borate-containing compound in the gel has been found to be in the neighborhood of 1%, although where borate-containing compounds of relatively low borate radical contents are employed the above limit may be exceeded somewhat without adversely affecting the plaster behavior of the gel.

For all practical purposes, I prefer to employ an alkali-metal sulphate in the proportion of at least 1% based upon the total weight of the gel composition, if the impression material is to be used in the preparation of full or partial dentures and the like. Where the composition is to be employed in other uses, wherein but nominal strength increase in the gel state is required (as compared to plain agar-agar gels) the proportion of both borate and alkali-metal sulphate may be correspondingly reduced. For example, the incorporation of as little as .025% borax in an agar-agar gel showed a strength increase of roughly 25% over a corresponding plain agar-agar gel, with a resulting pH of 7.9, and the strength was further increased by the incorporation of 2% potassium sulphate in the composition, with a resultant pH of 7.65, and a slightly better plaster set was obtained. Where the borax content is raised to in the neighborhood of 0.75%, at least 3% $K_2SO_4$ is required in order to secure good plaster behavior. In general, a ratio of about 1:4 between the borate and alkali-metal sulphate contents has been found useful.

As far as is known, any chemical compound containing a borate radical is operative to secure the desired toughening action, although by virtue of other properties, such as physiological properties which might prevent the use of the gel composition for oral impressions, some borate compounds would be objectionable. Among the borate-containing compounds which I have employed with complete success, may be listed: barium borate, borax (sodium tetraborate decahydrate), boric acid, cadmium borate, calcium borate, chromic borate, ferric borate, ferrous borate, magnesium borate, manganese borate, and zinc borate.

Compositions containing a suitable borate compound and having a pH value within the desired range may be secured by any one of several means. For example, I have found that an alkaline borate such as borax may be used directly, or may be partially neutralized with an acid, or acid salt, or reacted with some other metallic compound or salt which will produce a resultant borate compound which will impart the desired pH to the gel. Sulphuric acid serves as an example of a satisfactory acid, and sodium or potassium acid sulphate serve as examples of satisfactory acid salts. Conversely, an acid borate compound, such as boric acid, may be buffered with an alkali, such as sodium hydroxide, to secure the desired pH value. Examples of metallic salts which may be reacted with an alkaline borate to produce a modified borate of the desired properties will be given in the following description. These latter materials are in general the more convenient and practical, in view of the fact that the proportion thereof in the gel material may be varied within comparatively wide limits without bringing the pH value of the resulting gel outside of the desired range, while the amount of an acid or acid salt which is added to neutralize an alkaline borate as above described must be very accurately controlled, and the compounding steps involved in the addition of the alkaline borate and a buffering acid constituent (or an acid borate and a buffering alkali) are somewhat more complicated.

Certain borates give pH values within the more desired range of pH 7.9 to 8.2 when dissolved or suspended in water; among these may be listed barium borate, cadmium borate, and manganese borate. It has further been noted that the method of preparation of the borate will affect its composition and will therefore affect the results obtained with it. Relatively little is known about the chemical constitution or formulae of the different metallic borates; for example, it is known that the product obtained from the reaction between a manganese salt and sodium tetraborate (in aqueous solution) is not manganous tetraborate as may be expected, but is ordinarily monohydrated manganous tetrahydro orthoborate. Barium and cadmium probably form similar borates.

The dental impression composition of the present invention is one which consists principally of a reversible hydrocolloid gel, and more particularly a gel of a vegetable mucilage, such as agar-agar, Irish moss, or Iceland moss (all of which are polymers of derivatives of hexose sugars). The composition also contains a small proportion, generally in the neighborhood of one per cent or less of a borate-containing reagent, which may be either added to the other constituents of the composition or formed in the compounding process, and the pH value of the composition is between the approximate limits of pH 6.8 to pH 8.5. The composition preferably also contains 1% or more, as from 2% to 4%, of an alkali-metal sulphate, when the pH is outside the range of pH 7.9 to 8.2 while still within the broad approximate range of pH 6.8 to pH 8.5.

It will be appreciated that materials such as glycerine, coloring materials, flavoring agents, and/or fillers may also be incorporated in the composition. Various water-soluble food dyes are available for coloring the mix, and anything from anise to wintergreen may be employed as a flavoring material. Suitable antiseptic agents may also be added if desired; in any case the addition of flavoring materials or antiseptic agents should not be so great as to give the final product a disagreeable or strong odor or taste. Such fillers as zinc oxide, titanium oxide, finely dispersed rubber compounds, emulsified resins and the like, may be employed as fillers. Fibrous materials, such as wood fiber may also be added.

As a specific example of a dental hydrocolloid according to this invention, I may make up the following mixture:

|  | Pounds |
|---|---|
| Agar-agar (No. 1 Kobe, strip) | 30.00 |
| Borax (technical) | 0.42 |
| Potassium sulphate | 4.20 |
| Water, q. s. to make | 210.00 |

The agar-agar is washed in fresh water for about half an hour and then drained. The wet agar-agar is heated and stirred in a steam-jacketed kettle until a smooth sol is obtained. The borax (as a saturated solution in water) is then added slowly, with constant stirring, and the potassium sulphate is then added. The stirring and heating is continued until the product is smooth and homogeneous, and water is added or evaporated until a final weight of 210 lbs. results. The material may then be packaged for shipment. The resulting pH value of the above mixture will be in the neighborhood of pH 8.3, depending somewhat upon the character of the agar-agar, the pH of this raw material having been found to vary to some degree, and the pH of the water used.

As a further example of a composition prepared according to the present invention, using a metallic borate, I may prepare manganous borate by adding a solution of manganese chloride to a solution of borax, precipitating the manganous borate, which is separated by decantation, filtering ando washing, and drying if desired, before addition to the agar mass. The composition employed may be as follows:

|  | Pounds |
|---|---|
| Agar-agar (No.1 Kobe, strip) | 30.00 |
| Manganous borate, powder | 1.05 |
| Potassium sulphate | 4.20 |
| Water, q. s. to make | 210.00 |

The agar-agar is washed in fresh water for about half an hour and then drained. In this washing the agar-agar soaks up almost all the water needed for the batch, so that ordinarily no additional water is necessary. The wet agar-agar is heated in a steam-jacketed kettle and stirred constantly at a moderate rate. After an hour or two of heating and stirring, the agar-agar will have formed a fairly smooth sol. Hot water may be added at this point, if necessary, to bring the total weight of the material to a little over 210 pounds. The manganous borate powder is added at this time, as by sifting through a fine mesh screen (or by ball-milling in a small quantity of water, and adding the wet mix), and added to the agar-agar sol under continuous stirring. The potassium sulphate may then be added in the form of fine crystals or powder or in water solution. The stirring and heating is continued until the manganous borate is uniformly distribtued and the potassium sulphate is dissolved (if added as a solid), and longer if necessary to evaporate any excess water which may have been added, so as to end with a final weight of 210 pounds. The hot sol may then be filled into suitable containers and packaged for shipment.

Commercial manganous borate powder may be employed, if desired, in which case it is desirable that a very good grade be selected inasmuch as impurities present in the material may have considerable effect on the properties of the final gel.

As another example of the preparation of a dental impression composition according to the present invention I may employ a mixture of:

|  | Pounds |
|---|---|
| Agar-agar (No. 1, Kobe, strip) | 30.00 |
| Borax | .70 |
| Barium chloride ($BaCl_2.2H_2O$) | .93 |
| Potassium sulphate | 4.20 |
| Water, q. s. to make | 210.00 |

The agar-agar gel may be made up as described in connection with the first example, and the barium chloride added in crystal form and the mixture stirred until the barium chloride is dissolved, after which the dry borax is added a little at a time. This method requires a strong stirring apparatus to keep the material properly stirred, as the borax will cause the material to become extremely viscous if added too rapidly. A slow and careful addition of the borax is desirable. As a modification of this method, the barium borate may be prepared by separately reacting the barium chloride with the borax, filtering and washing the material, and adding the white precipitate to the gel as in accordance with the first described example.

As a further example of the preparation of a material according to the present invention, I may take 30 lbs. of agar-agar prepared as above described, .7 lb. of boric acid, 4.2 lbs. of potassium sulphate, and sufficient sodium hydroxide to establish the pH value of the material at the correct range. According to this procedure, the agar-agar gel is worked up hot as described in connection with the first example, and the boric acid is dissolved in the hot sol and thoroughly mixed. The sodium hydroxide is then added to the mixture, preferably as a 5% solution or the like, and small samples are withdrawn from the batch and allowed to gel, and pH determinations made thereon, adding the sodium hydroxide until the pH value of the material is brought to within the desired range. The potassium sulphate may then be dissolved in the sol and the heating and stirring continued until the final weight is 210 pounds, water being evaporated or added as necessary.

As another example of the practice of the present invention, a composition may be made up with agar-agar, borax, sulphuric acid, potassium sulphate, and water, in a manner comparable to that immediately above described, in which the borax is buffered with the sulphuric acid until the desired pH value is secured. In the practice of this particular procedure, it is desirable to add a small portion of the borax to the sol while stirring, then a little sulphuric acid, until the sol is no longer sufficiently alkaline to be colored pink with phenolphthalein, after which more of the borax is added and more sulphuric acid, while checking with the indicator, until all of the borax has been added. The final neutralization or buffering with the sulphuric acid is made very carefully and checked by cooling some of the sol as in the above example and checking the pH value of the cold gel. The potassium sulphate may be added last. If all of the borax were added in one amount, the sol would become so viscous that it would be substantially impossible to properly stir the mixture, wherefore the step-by-step alternate addition of borax and sulphuric acid is more advantageous. The sulphuric acid, serving as a buffering agent for the borax, is preferably added as a ten per cent solution or there abouts, and a solution of sodium bisulphate or potassium bisulphate may equivalently be substituted in this connection. If this substitution is made, the proportion of alkali metal sulphate added to secure the desired plaster-hardening action may be correspondingly reduced.

As a further example, a composition of agar-agar, water and manganous borate powder may be prepared, in the absence of added plaster-accelerating agent such as the above-described alkali metal sulphate. For example, I have prepared a suitable composition by compounding 0.21 lb. of manganous borate powder in an agar-agar mixture containing 30 lbs. of agar-agar, and prepared according to the first example above.

The pH values given herein are the values exhibited by the gel material in solidified state, i. e., at room temperature (20° C.). The pH values at elevated temperatures (with the material in sol condition) are somewhat lower, and in addition to the difficulty of accurate pH determinations on the material in sol condition, the pH values at such elevated temperatures do not appear to consistently constitute an indication of the desired properties of the material. The data given herein are based on electrometric pH determinations, using a gold electrode, by triturating 10 grams of gel with 10 cc. of pH 7.0 distilled water, allowing to stand at room temperature for two hours, adding a small amount of quinhydrone, and taking readings at approximately 20° C. It is possible that other values of pH may be obtained by modified test procedures, and for this reason the described and claimed pH range in the materials will be considered as having been determined by the above procedure.

It will further be appreciated that the compounding order set forth in the above examples is not critical, and may be modified in accordance with the preference of and the facilities available to the compounder. As a specific example of such modification, I have dissolved all the soluble reagents to be employed in a given composition in the water which is used to swell the dry agar-agar, wherefore when the composition is heated to melt the agar-agar, a completely homogeneous gel is more readily secured than where dry reagents or concentrated solutions thereof are added.

I claim:

1. A dental impression composition consisting principally of a reversible hydrocolloid gel and containing a borate-containing reagent in an amount not exceeding about 1% and the pH value of such composition being within the range of about pH 6.8 to pH 8.5.

2. A dental impression composition consisting principally of a reversible hydrocolloid gel, and containing a plaster-hardening agent and a borate-containing reagent, said reagent being present in said composition in an amount not exceeding about 1% and the pH value of such composition being within the range of about pH 6.8 to pH 8.5.

3. A dental impression composition of the hydrocolloid type having high strength characteristics in the gel condition, which comprises: a reversible hydrocolloid vegetable mucilage gel modified by a borate-containing reagent in solution, and having a pH value within the range of about pH 6.8 to pH 8.5, said composition being one which will secure an effective "plaster set" against a dental grade of gypsum plaster within about 30 minutes.

4. A dental impression composition as set forth in claim 3, and containing in addition a plaster hardening agent.

5. A dental impression composition as set forth in claim 3, and comprising in addition 1% or more of an alkali metal sulphate in solution.

6. A dental impression composition consisting principally of a reversible hydrocolloid gel and containing a borate-containing reagent in an amount not exceeding about 1%, and having a pH value within the range of about pH 7.9 to pH 8.2.

7. A dental impression composition as set forth in claim 6, in which said borate-containing reagent comprises a borate compound added in such proportion as to establish the pH of said gel at a value within said range.

8. A dental impression composition as set forth in claim 1 and containing in addition a plaster hardening agent, the ratio of borate-containing reagent to plaster-hardening agent being in the neighborhood of not less than 1:4.

9. A dental impression composition consisting principally of a reversible hydrocolloid gel of a vegetable mucilage and containing manganous borate in an amount not exceeding 1%.

BENNETT PREBLE.